United States Patent [19]

Whittle

[11] Patent Number: 4,695,936
[45] Date of Patent: Sep. 22, 1987

[54] SWITCHING MODE POWER SUPPLY START CIRCUIT

[75] Inventor: Rex W. J. Whittle, Kowloon, Hong Kong

[73] Assignee: Astec Components, Ltd., Santa Clara, Calif.

[21] Appl. No.: 827,808

[22] Filed: Feb. 7, 1986

[51] Int. Cl.⁴ ........................................... H02M 3/335
[52] U.S. Cl. ........................................ 363/21; 363/49
[58] Field of Search .............................. 363/20, 21, 49

[56] References Cited

U.S. PATENT DOCUMENTS

| 4,063,307 | 12/1977 | Stephens | 363/21 |
| 4,246,634 | 1/1981 | Purol | 363/19 |
| 4,389,702 | 6/1983 | Clemente et al. | 363/21 |

FOREIGN PATENT DOCUMENTS

| 29234 | 3/1980 | Japan | 363/21 |
| 195471 | 11/1983 | Japan | 363/21 |

*Primary Examiner*—William H. Beha, Jr.
*Attorney, Agent, or Firm*—Fitch, Even, Tabin & Flannery

[57] ABSTRACT

A start circuit for a DC-DC switching converter power supply is disclosed and includes a relaxation oscillator connected to the DC voltage source for periodically generating a start pulse at a predetermined frequency. The start pulse is coupled to a power switch on the primary side of a power transformer and functions to cause the power switch to close for the duration of each start pulse. The secondary winding of the power transformer is coupled to an energy storage device such as a capacitor which stores the charge coupled across the power transformer each time a start pulse is generated. When sufficient energy has been stored in the capacitor in this manner, a circuit detects this energy level and causes the energy to be coupled to a pulse generator circuit also located on the secondary side of the power transformer. Sufficient energy as coupled to the pulse generator in this manner to enable the pulse generator to begin normal operation, the pulse generator thereupon outputs pulse width modulated pulses which are coupled across in isolator to the power switch to enable normal feedback control operation of the power supply.

17 Claims, 3 Drawing Figures

FIGURE 2
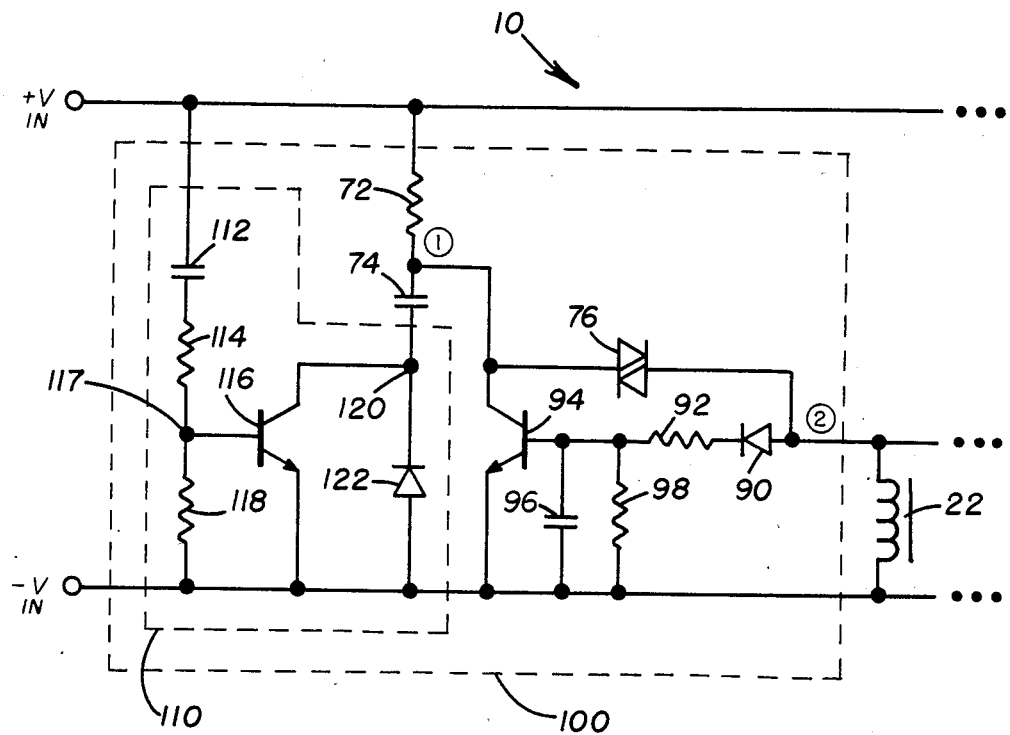
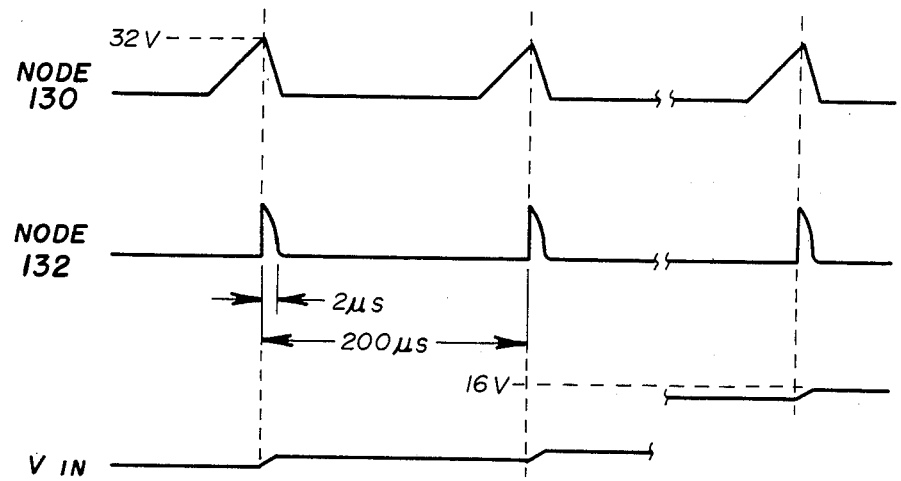
FIGURE 3

SWITCHING MODE POWER SUPPLY START CIRCUIT

BACKGROUND OF THE INVENTION

The present invention relates to switching mode power supplies and more particularly to start circuits for starting the generation of pulse width modulated switching pulses.

Switching mode power supplies for converting a first DC voltage to a second DC voltage are commonly used to power electronic systems from an alternating current voltage source. Such power supplies are generally used because of their relatively low cost and because they can operate at frequencies above 20 kHZ, thereby enabling the use of much smaller and lighter power transformers, coils, and filter capacitors. The control circuits for such power supplies usually include a pulse generator or oscillator which generates a series of pulse width modulated pulses. These pulses are used to control the duration of applications of the DC input voltage across the power transformer in a single ended power supply.

In general, a conventional switching power supply includes a DC voltage source which is normally derived from an alternating current line via a rectifier, a power transformer including a primary winding and at least one secondary winding, a pulse generator for generating a train of pulses of varying pulse width as a function of the present value of the output voltage, and a transistor switch in series between the DC voltage source and the primary winding of the power transformer. This transistor switch is controlled by the pulses generated by the pulse generator such that the switch closes for the duration of each said pulse. The pulse generator monitors the output DC voltage generated by the power supply, compares this voltage to a fixed reference voltage, and either expands the pulse width of the pulse generator feedback pulse to raise the output voltage, or narrow the pulse width of this pulse to generate a lower DC output, to thereby maintain the output DC voltage at a prescribed predetermined voltage level. A rectifier and filter circuit is also connected to the secondary winding for generating the output DC voltage. Such feedback of the output DC voltage is necessary since otherwise the output voltage would vary as a function of the varying demand of the load being powered by this output voltage.

The two standard types of switching power supplies are boost (step-up) and buck (step-down) power supplies. The conventional boost switching power supply is also called a flyback power supply or flyback converter. In such power supplies, energy is stored in the power transformer when the power switch is on and then delivered from the transformer out to the load when the switch is off. More specifically, when the transistor power switch is conducting, current increases at a linear rate through the primary of the power transformer, which behaves like an inductor by storing energy in its core. As soon as the switch is cut off, the flux in the transformer core decreases, permitting the current to flow in the secondary circuit. This current charges an output capacitor as well as feeds power to the output load. The pulse width modulating pulse generator compares the output voltage with a fixed reference voltage for generation of the feedback pulse width modulated pulse.

Conventional buck power supplies include forward converter power supplies which operate in a similar manner to flyback power supplies except that a separate inductor on the secondary side of the power transformer is used to store energy rather than the power transformer. In this case, when the switching transistor is on, as current flows through the primary winding, current is also caused to flow from the secondary winding through a diode rectifier into an inductor and out to the output load. When the transistor is off, this inductor continues to provide current flow to the output load.

Both types of above described power supplies generally require some sort of start circuit to initiate the pulse width modulated pulse train needed to control the transistor power switch. A number of such start circuits are known in the art, but all of them have disadvantages where one desires to maintain the pulse generator isolated on the secondary side of the power supply. Maintaining isolation in a power supply between its primary winding and its secondary winding sides is necessary in many applications. In such supplies, the secondary side of the supply must be kept completely electrically isolated from the primary side. It is a common requirement, for example, that commercial isolated power supplies be able to withstand a 5,000 volt power surge without breakdown. Transformers having isolation between their primary and secondary windings, or opto-isolators, are used to provide such isolation. Transistor switches or other such semiconductor devices cannot be used for this purpose, since their breakdown voltage may only be of the order of 50-100 volts. A key problem in such isolated power supplies is how to power a pulse generator isolated from the primary side, especially when the power supply is being initially powered up when the pulse generator has not yet begun to regulate the output DC voltage.

One prior art solution to providing power to a pulse generator, while maintaining the isolation of the pulse generator means on the secondary side, was to couple a second power source across a second isolating transformer to the pulse generator. This is a complex and expensive solution to the problem.

Another solution was to position the pulse generator on the primary side and only generate the output DC voltage error signal on the secondary side of the power transformer. This error signal was then coupled across an isolator back to the primary side. The drawback of this solution is two fold. First, it is difficult to couple a DC level across an isolator, since either the error signal level needs to be converted into a pulse, as required by an isolation transformer, or a more expensive opto-isolator must be used. In addition, this solution requires that control circuitry be duplicated on both the primary and secondary sides of the power transformer.

A third and probably least desirable solution was to position the pulse generator on the primary side and have it monitor the primary winding voltage in an attempt to control the output voltage level. This solution presumes that the voltage on the output of the secondary will reflect or be a function of the voltage on the primary, but this is not necessarily the case, depending on the rate of change of the power supply's output load.

A recent prior art reference, U.S. Pat. No. 4,246,634, illustrates how difficult it is to successfully design an isolated power supply with a pulse generator on the secondary side of the isolated power supply. The invention disclosed in this reference purports to provide such an isolated supply but it fails in two respects. First, although the pulse generator is powered from a secondary winding, the voltage being monitored is not the output voltage. Rather, the monitored voltage is the same voltage that is generated by the secondary winding used to power the pulse generator. A different secondary winding couples energy to the output load. More importantly, the start circuit used in this prior art reference to initially power the pulse generator on power supply start-up couples power directly to the pulse generator. No high voltage isolation is provided. Once the pulse generator start circuit is operating normally, it is isolated from the pulse generator merely by a transistor that has been turned off. Such a circuit is susceptible, as described above, to high voltage noise spikes or other interference.

What is therefore needed is a means for powering an isolated pulse generator for a single ended switching power supply of the buck or boost type. The pulse generator must be initially powered on the secondary side by means of a start circuit on the primary side and thereafter powered from the secondary side once normal power supply operation is initiated.

SUMMARY OF THE INVENTION

Therefore, a principal object of the present invention is to provide a start circuit for initially powering a pulse generator on the isolated secondary side of a power supply while maintaining the isolation of the pulse generator from the primary side of the power supply.

Another object of the present invention is to provide a start circuit for a pulse generator in a switching power supply wherein the start means automatically turns off once normal operation of the power supply has been initiated.

Still another object of the present invention is to provide a start circuit for a switching power supply which will latch off after a predetermined duration of time whether or not the power supply has gone on and will remain latched off until a predetermined subsequent event is caused to take place.

Broadly stated, the present invention is a start circuit for a DC/DC switching converter power supply including a relaxation oscillator connected to the DC voltage source for periodically generating a start pulse at a predetermined frequency, means for coupling the start pulse to the power switch of the power supply such that said switch is caused to close for the duration of each said start pulse, and means connected to the secondary winding of the power supply for powering the pulse generator, including energy storage means, means for coupling an incremental amount of energy to said storage means each time said start pulse is generated, means for detecting when sufficient energy is stored in said storage means to enable initial operation of said pulse generator means, and means responsive to said detecting means for coupling said stored energy to said pulse generator means. Once said pulse generator is initially in operation, a separate circuit on the secondary side of said power supply couples ongoing power to the pulse generator for its normal operation.

BRIEF DESCRIPTION OF THE DRAWINGS

FIG. 2 is a schematic diagram of an alternate embodiment of a start circuit usable in a switching mode power supply of FIG. 1; and FIG. 3 is a timing diagram of the operation of the start circuit of FIG. 1.

DESCRIPTION OF THE PREFERRED EMBODIMENTS

Figure 1:
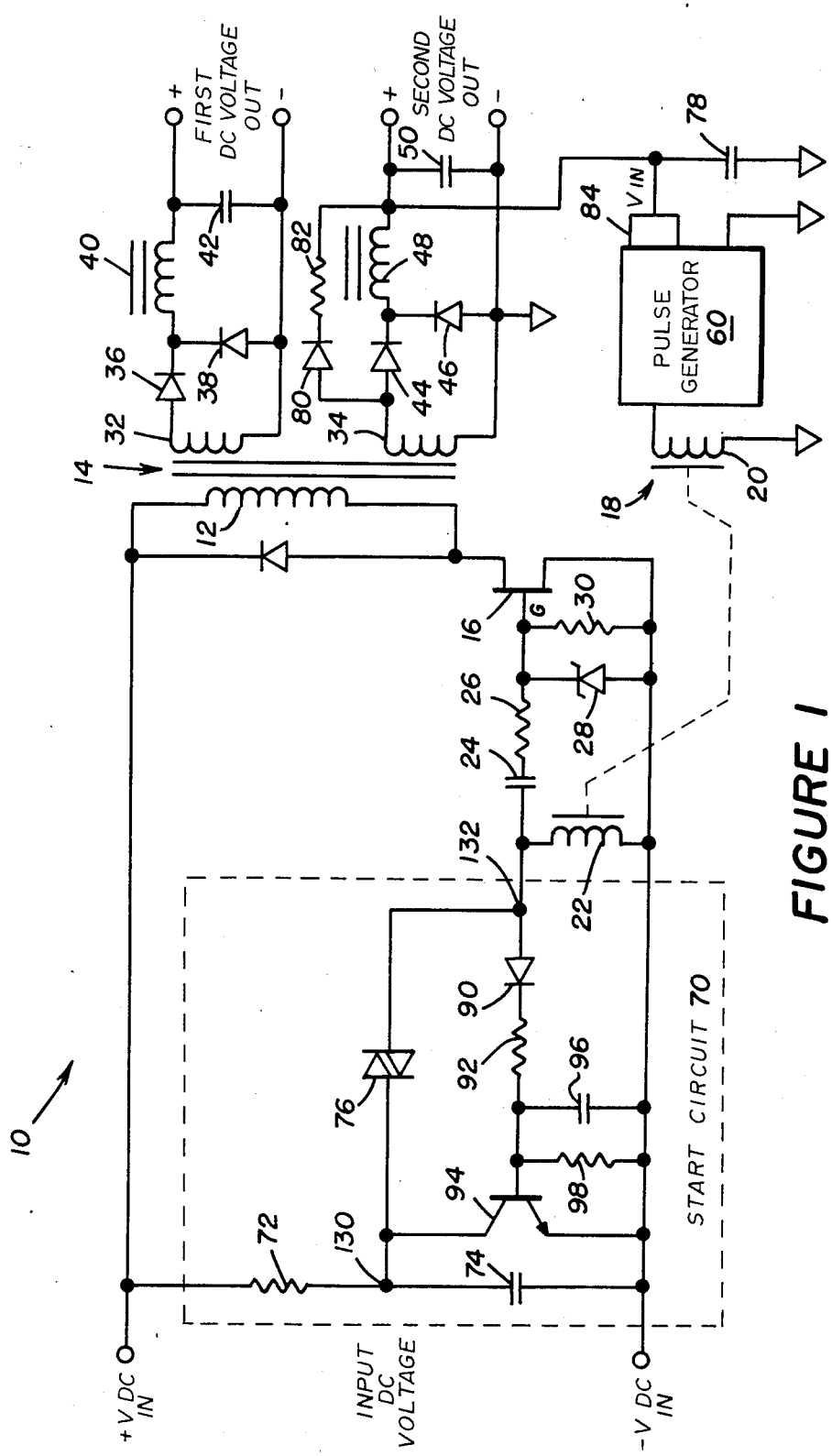
FIG. 1 is a circuit diagram of a forward converter switching mode power supply including a start circuit according to the present invention.

A conventional DC/DC converter power supply including a start circuit according to the present invention is shown at 10 in FIG. 1. Although FIG. 1 illustrates a forward converter type switching power supply, other switching power supply topologies may include a start circuit according to the present invention.

The input DC voltage is applied to power supply 10 at its input terminals, shown as +VDC IN and −VDC IN. This input DC voltage is coupled to a series circuit comprising the primary winding 12 of a power transformer 14 and a power switch 16. Switch 16 provides switch means for coupling the DC input voltage across primary winding 12, and is preferably a 500 volt power field effect transistor (FET) having an on resistance of 4 to 6 ohms. The primary side of power supply 10 is shown to the left of power transformer 14 in FIG. 1 and the secondary side of power supply 10 is shown on the right of transformer 14.

Gate drive for switch 16 in normal operation is provided from the secondary side of power transformer 14 via an isolation transformer 18. Transformer 18 is constructed with the necessary safety isolation to isolate the primary winding 20 of said transformer 18, from its secondary winding 22. Primary winding 20 is on the secondary side of power supply 10 and secondary winding 22 is on the primary side of power supply 10. Secondary winding 22 is connected to the gate G of switch 16 via a capacitor 24 and a resistor 26. Capacitor 24 is preferably a 100 microfarad capacitor. Resistor 26 is used to slow down slightly the switching speed of switch 16 to reduce electromagnetic interference. DC restoration of the switch 16 gate is provided by a zenor diode 28. Resistor 30 is used to discharge capacitor 24 and hold the gate of switch 16 to common (−VDC) in the absence of drive current from winding 22.

As seen in FIG. 1, the secondary side of transformer 14 includes two secondary windings 32 and 34. Each winding is constructed in a conventional manner to provide a first DC output voltage and a second DC output voltage, respectively, after rectification and filtering of the outputs of secondary windings 32, 34. First with regard to secondary winding 32, the output of this winding is rectified via diodes 36 and 38 and then coupled through an inductor 40 to an output filtering capacitor 42, which is connected across the output plus and minus terminals of the first DC voltage output line. The output of secondary winding 34 is rectified via diodes 44 and 46 and then coupled through an inductor 48 to an output filter capacitor 50, which is connected across the output plus and minus terminals of the second DC output voltage. As will be described in greater detail below, this second DC output voltage is also used to power pulse generator 60.

Pulse generator 60 monitors the value of the second output voltage and generates a train of pulse width modulated pulses representative of the variation of said output voltage from a reference voltage source. These pulses are coupled via isolation transformer 18 to the gate of switch 16, as described above.

In operation of a conventional forward converter power supply 10, when switch 16 closes, current is coupled across transformer 14 and into inductors 40 and 48 for generating the output first and second DC voltages, respectively. The second DC voltage output is monitored by pulse generator 60, which generates a train of pulses which are pulse width modulated as a function of the present level of the second DC output voltage. These pulses are fed back to switch 16 via isolation transformer 18 and cause transistor switch 16 to close for the duration of each said pulse generated by pulse generator 60. The resultant output DC voltage is therefore regulated at a desired voltage level as a function of the reference voltage in pulse generator 60.

A novel start circuit according to the present invention is shown at 70 in FIG. 1. Included in this start circuit is a relaxation oscillator means connected to the DC voltage source for periodically generating a start pulse at a predetermined frequency. This relaxation oscillator means includes a resistor 72, a capacitor 74, and a diac 76. In operation, capacitor 72, preferably a 10 microfarad capacitor, is charged by resistor 72, a 100K resistor until capacitor 74 reaches a voltage corresponding to the breakdown voltage of diac 76. Preferably, this is about 30 to 32 volts. When the diac 76 breaks down, it discharges capacitor 74 into the gate of transistor switch 16. This current into the gate of switch 16 causes switch 16 to turn on for the duration of the charge pulse. Transistor 16 thereafter goes off until capacitor 74 again charges up to the breakdown voltage of diac 76. This charging and switch turn on process continues until the pulse generator 60 on the secondary side of power supply 10 starts normal operation and begins driving switch 16 via isolation transformer 18.

Means are also connected to secondary winding 34 for powering the pulse generator means 60 initially until pulse generator 60 begins normal operation. The above described closure of transistor switch 16 as a function of the charge coupled to it from capacitor 74 provides a source of incremental energy output from secondary winding 34. This incremental energy is coupled to an energy storage means comprising capacitor 78 so that the energy is coupled to capacitor 78 via a diode 80 and resistor 82. Diode 80 and resistor 82 rectify the current out of secondary winding 34 and couple it to capacitor 78. Capacitor 78 is coupled across the V IN power input and common return of pulse generator 60. During startup, pulse generator 60, which is preferably a conventional integrated circuit such as a Unitrode 3842 feedback control device, ordinarily takes a very low quiescent current. This is due to the operation of a low voltage lock-out circuit 84 which prevents higher input current from flowing into pulse generator 60 until sufficient voltage appears at V IN. Note that insufficient power is available from diode 80 and resistor 82 to continue powering pulse generator 60. Once capacitor 78 charges up to a sufficiently high voltage, this low voltage lock-out circuit 84 in pulse generator 60 senses this voltage and allows capacitor 78 to couple this energy into pulse generator 60, thereby providing initial power therefor sufficient to enable pulse generator 60 to begin operation.

For example, if capacitor 78 is a 100 microfarad capacitor, it takes approximately 10 milliseconds for it to charge down from 16 volts to 10 volts, thereby providing 40 to 100 milliamp of power for pulse generator 60. The lock-out circuit provides a hysteresis effect wherein it turns on when the voltage rises to 16 volts and does not turn off until the input voltage drops below 9 volts.

Once pulse generator 60 begins operation, power is supplied to the V IN terminal of pulse generator 60 via conventional operation of diodes 44 and 46 and inductor 48. Once normal power is being coupled to pulse generator 60 via diodes 44, 46 and inductor 48, resistor 82 limits the amount of energy coupled through diode 80.

In operation of the start circuit according to the present invention, the relaxation oscillator means generates a pulse of approximately 2 microseconds in pulse width every 200 microseconds. The 200 microsecond timing is controlled by the RC time constant of resistor 72 and capacitor 74. With these pulses being coupled as energy to capacitor 78 via secondary winding 34, it takes between 10 and 100 milliseconds for the capacitor 78 to charge up sufficiently to overcome the low voltage lock-out circuit 84 and provide initial power to generator 60. Further discussion of this operation is given with reference to FIG. 3 below.

Means are also provided for disabling start circuit 70 operation once normal operation of pulse generator 60 has been initiated. This means includes a diode 90, a transistor 94 and a resistor 92 connected in series to the base of transistor 94. A capacitor connecting the base of transistor 94 to the common return line is shown in 96. In operation, once transistor 16 is operating in its normal mode from gate drive provided by pulse generator 60, sufficient additional gate drive is available to drive the base of transistor 94 thereby turning transistor 94 on. Once transistor 94 turns on, further operation of the start circuit 70 is disabled.

In operation, as can be seen, the current provided by the secondary winding 22 is coupled through diode 90 through resistor 92 and begins to charge up capacitor 96 Once capacitor 96 has been charged up to a sufficient voltage to turn on transistor 94, transistor 94 goes on. During normal operation, sufficient current continues to be coupled through diode 90 and into the base of transistor 94 to maintain transistor 94 on. That is, capacitor 96 and resistor 92 act to couple the average value of voltage across secondary winding 22 to the base of transistor 94. Once transistor 16 ceases operation, insufficient current is provided to maintain transistor 94 on and so it goes off thereby re-enabling start circuit 70 to again provide start pulses to the gate of switch 16. A resistor 98 may also be provided to ensure that capacitor 96 does not charge up sufficiently enough to turn on transistor 94 until normal operation of the power supply 10 has been initiated.

An alternate embodiment of a start circuit according to the present invention is illustrated at 100 FIG. 2. Components that are common to FIG. 1 and FIG. 2 are shown with the same number.

Start circuit 100, in addition to including relaxation oscillator means and means for turning off said relaxation oscillator means once the power supply is started, further includes means for latching off the power supply 10 if a fault condition is detected that causes the normal operation of the power supply 10 to cease. Basically, this latch off circuit operates as an initial one-shot to allow normal operation of the start circuit only during the initial power up phase of the power supply and thereafter disables further operation of the start circuit.

A preferred embodiment of the start circuit latch off means according to the present invention is shown at 110 in FIG. 2. This latch off means includes a capacitor 112 in series with a voltage divider resistor network comprising a resistor 114 and a resistor 118. The node 117 between these two resistors is also coupled to the base of a transistor 116. The emitter of transistor 116 and the side opposite node 117 of resistor 118 is coupled to the common return line -V IN. The collector of transistor 116 is coupled to a node 120. The common return side of capacitor 74 is also coupled to node 120, and node 120 is also coupled to the common return line via a diode 122.

In operation, when power is initially turned on, the base of transistor 116 is immediately pulled high by capacitor 112 to enable operation of the start circuit. Capacitor 74 is allowed to discharge via diode 122. After a predetermined length of time set by the RC circuit, comprising capacitor 112 and resistors 114 and 118, the voltage on the base of transistor 116 falls until transistor 116 turns off. This stops the normal charging of capacitor 74, and thus the operation of the relaxation oscillator circuit. This stops further operation of start circuit 100. As can be seen, the voltage on the base of transistor 116 is maintained low by capacitor 112 until power is received from power supply 10. That is, transistor 116 stays off and start circuit 100 latched off until capacitor 112 is allowed to discharge through external interaction, as by removing the DC input voltage from power supply 10 and then reapplying it.

FIG. 3 is a timing diagram of the operation of the start circuit 100 shown in FIG. 1. The operation of capacitor 74 is illustrated by the voltage curve appearing at node 130 in FIG. 1. As can be seen, the voltage at node 130 rises at a ramp rate controlled by the RC time constant of resistor 72 and capacitor 74. When this voltage reaches the diac 76 breakdown voltage of 32 volts, the charge in capacitor 74 is coupled out through diac 76 at node 132 and into the gate of transistor 16. On the secondary side of power supply 10, the energy coupled out of secondary winding 34 is stored in capacitor 78 to create a ramp up voltage at the input node V IN of pulse generator 60. When this V IN voltage reaches 16 volts the low voltage lock out means 84 in pulse generator 60 allows this energy to be coupled to pulse generator 60 to provide initial powering of generator 60.

It is of course understood that although the preferred embodiments of the present invention have been illustrated and described, various modifications, alternatives and equivalents thereof will become apparent to those skilled in the art, and, accordingly, the scope of the present invention should be defined only by the appended claims and equivalents thereof.

What is claimed is:

1. In a DC/DC converter power supply including a DC voltage source, a power transformer including a primary winding and a secondary winding, rectifier and filter means connected to said secondary winding for generating an output DC voltage from the current output by said secondary winding, pulse generator means for generating a train of pulses of varying pulse width as a function of the present value of said output voltage, switch means coupled to said primary winding such that when said switch means closes, said DC voltage source is coupled across said primary winding, means for coupling said train of pulses to said switch means, said pulses causing said switch means to close for the duration of each said pulse, the improvement comprising start means responsive to the initiation of said DC voltage source for starting the operation of said pulse generator means, said start means including:
    relaxation oscillator means connected to said DC voltage source for periodically generating a start pulse at a predetermined frequency;
    means for coupling said start pulse to said switch means, said start pulse causing said switch means to close for a predetermined duration; and
    means connected to said secondary winding for powering said pulse generator means, said powering means including energy storage means; means for coupling an incremental amount of energy to said storage means each time said start pulse is generated; means for detecting when sufficient energy is stored in said storage means to enable initial operation of said pulse generator means; means responsive to said detecting means for coupling said stored energy to said pulse generator means; and means for coupling ongoing power to said pulse generator means once said pulse generator means begins operation.

2. The DC/DC converter power supply of claim 1 wherein said relaxation oscillator means comprises:
    a capacitor;
    means for charging said capacitor;
    means for discharging said capacitor when the voltage across said capacitor reaches a predetermined breakdown voltage level.

3. The DC/DC converter power supply of claim 2 wherein said means for discharging said capacitor comprises a diac.

4. The DC/DC converter power supply of claim 1 wherein said energy storage means comprises a capacitor, said means for coupling an incremental amount of energy to said storage means comprising means for rectifying the energy output by said secondary winding and for coupling said rectified energy to said capacitor.

5. The DC/DC converter power supply of claim 4 wherein said means for detecting when sufficient energy is stored in said storage means comprises a low voltage lockout means coupled to said capacitor for detecting when the energy stored in said capacitor exceeds a predetermined voltage level.

6. The DC/DC converter power supply of claim 1 wherein said means for powering said pulse generator means comprises:
    means for rectifying the energy output of said secondary winding;
    a capacitor coupled to the output of said rectifying means;
    voltage lockout means connected to said capacitor for detecting when the voltage across said capacitor exceeds a predetermined voltage, for coupling the energy from said capacitor to said pulse generator means when said voltage is exceeded, and for maintaining the coupling of energy from said capacitor to said pulse generator until said capacitor voltage drops below a predetermined minimum voltage.

7. The DC/DC converter power supply of claim 1 wherein said start means further comprises means for disabling said relaxation oscillator means when said pulse generator means begins to be powered by said ongoing power means.

8. The DC/DC converter power supply of claim 7 wherein said relaxation oscillator means comprises a capacitor, means for charging said capacitor, and means for discharging said capacitor when the voltage across said capacitor reaches a predetermined breakdown voltage level, and wherein said means for disabling said relaxation oscillator means comprises:
    means for detecting when said train of pulses is being coupled to said switch means; and means responsive to said detecting means for disabling said capacitor from charging.

9. The DC/DC converter power supply of claim 8 wherein said disabling means further comprises means for re-enabling said capacitor charging when said pulse generator means is no longer generating said train of pulses.

10. The DC/DC converter power supply of claim 1 wherein said start means further comprises means for latching off said relaxation oscillator means a predetermined time after said DC voltage source has been initiated.

11. The DC/DC converter power supply of claim 10 wherein said latching off means comprises:
second switch means for initially enabling the operation of said relaxation oscillator means; and
timing means for disabling said second switch means after a predetermined point in time.

12. The DC/DC converter power supply of claim 11 wherein said timing means comprises a resistor and a capacitor connected in series with said DC voltage source for generating a decreasing voltage as a predetermined function of time, and wherein said second switch means comprises a transistor connected in series between said DC voltage source and said relaxation oscillator means for generating an open circuit when said decreasing voltage drops below a predetermined minimum voltage, said transistor remaining off until said DC voltage source is removed from said power supply.

13. In a DC/DC converter power supply for converting an input DC voltage source of one magnitude into at least one output DC voltage of a predetermined different magnitude, including a transformer having a primary winding and a secondary winding, pulse generator means for producing a train of pulses of variable pulse width, switch means connected to said pulse generator means for switching said input DC voltage across said primary winding in response to the receipt of said pulses, rectifier and filter means connected to said secondary winding for generating an output DC voltage of said predetermined magnitude which is dependent upon the pulse widths of said pulses, said pulse generator means including means for sensing said output voltage and for varying said pulse widths so as to maintain said output voltage substantially constant at said predetermined magnitude, the improvement comprising start means responsive to the initiation of said voltage source for starting the operation of said pulse generator means, said start means including:
relaxation oscillator means connected to said DC voltage source for periodically generating a start pulse at a predetermined frequency;
means for coupling said start pulse to said switch means, said start pulse causing said switch means to close for a predetermined duration; and
means connected to said secondary winding for powering said pulse generator means, said powering means including energy storage means; means for coupling an incremental amount of energy to said storage means each time said start pulse is generated; means for detecting when sufficient energy is stored in said storage means to enable initial operation of said pulse generator means; means responsive to said detecting means for coupling said stored power to said pulse generator means; and means for coupling ongoing power to said pulse generator means once said pulse generator means begins operation.

14. The DC/DC converter power supply of claim 13 wherein said relaxation oscillator means comprises:
a capacitor;
means for charging said capacitor;
means for discharging said capacitor when the voltage across said capacitor reaches a predetermined breakdown voltage level.

15. The DC/DC converter power supply of claim 14 wherein said means for discharging said capacitor comprises a diac.

16. The DC/DC converter power supply of claim 13 wherein said start means further comprises means for disabling said relaxation oscillator means when said pulse generator means begins to be powered by said ongoing power means.

17. The DC/DC converter power supply of claim 13 wherein said start means further comprises means for latching off said relaxation oscillator means a predetermined time after said DC voltage source has been initiated.

* * * * *